April 18, 1967 W. J. KUDLATY 3,314,542
RESERVOIR FILTER STRUCTURE HAVING A BY-PASS VALVE
Filed Dec. 10, 1964 2 Sheets-Sheet 1

INVENTOR.
Walter J. Kudlaty,
BY Parker & Carter
ATTORNEYS.

April 18, 1967    W. J. KUDLATY    3,314,542
RESERVOIR FILTER STRUCTURE HAVING A BY-PASS VALVE
Filed Dec. 10, 1964    2 Sheets-Sheet 2

INVENTOR.
Walter J. Kudlaty,
BY Parker & Carter
ATTORNEYS.

United States Patent Office 3,314,542
Patented Apr. 18, 1967

3,314,542
RESERVOIR FILTER STRUCTURE HAVING
A BY-PASS VALVE
Walter J. Kudlaty, Elmhurst, Ill., assignor to Marvel Engineering Company, Chicago, Ill., a corporation of Illinois
Filed Dec. 10, 1964, Ser. No. 417,296
3 Claims. (Cl. 210—130)

This invention relates to filters and has particular relation to a filter structure particularly useful with reservoirs, tanks and the like.

One purpose of the invention is to provide a filter structure having portions secured substantially permanently to a tank or reservoir.

Another purpose is to provide a modular filter structure.

Another purpose is to provide a filter structure of maximum simplicity in construction and installation.

Another purpose is to provide a filter structure having easily replaceable filter elements.

Another purpose is to provide a filter for reservoir return lines and a cover structure therefor.

Another purpose is to provide a filter structure having easily replaceable by-pass elements.

Another purpose is to provide a filter structure having a housing secured to a reservoir.

Another purpose is to provide a filter structure including a housing secured to a reservoir ad modular filter and by-pass elements easily installed and removed from said housing.

Another purpose is to provide a filter reservoir assembly.

Other purposes will appear from time to time during the course of the specification and claims.

The invention is illustrated more or less diagrammatically in the accompanying drawings, wherein.

Like parts are indicated by like numerals throughout the specification and drawings.

Figure 1:
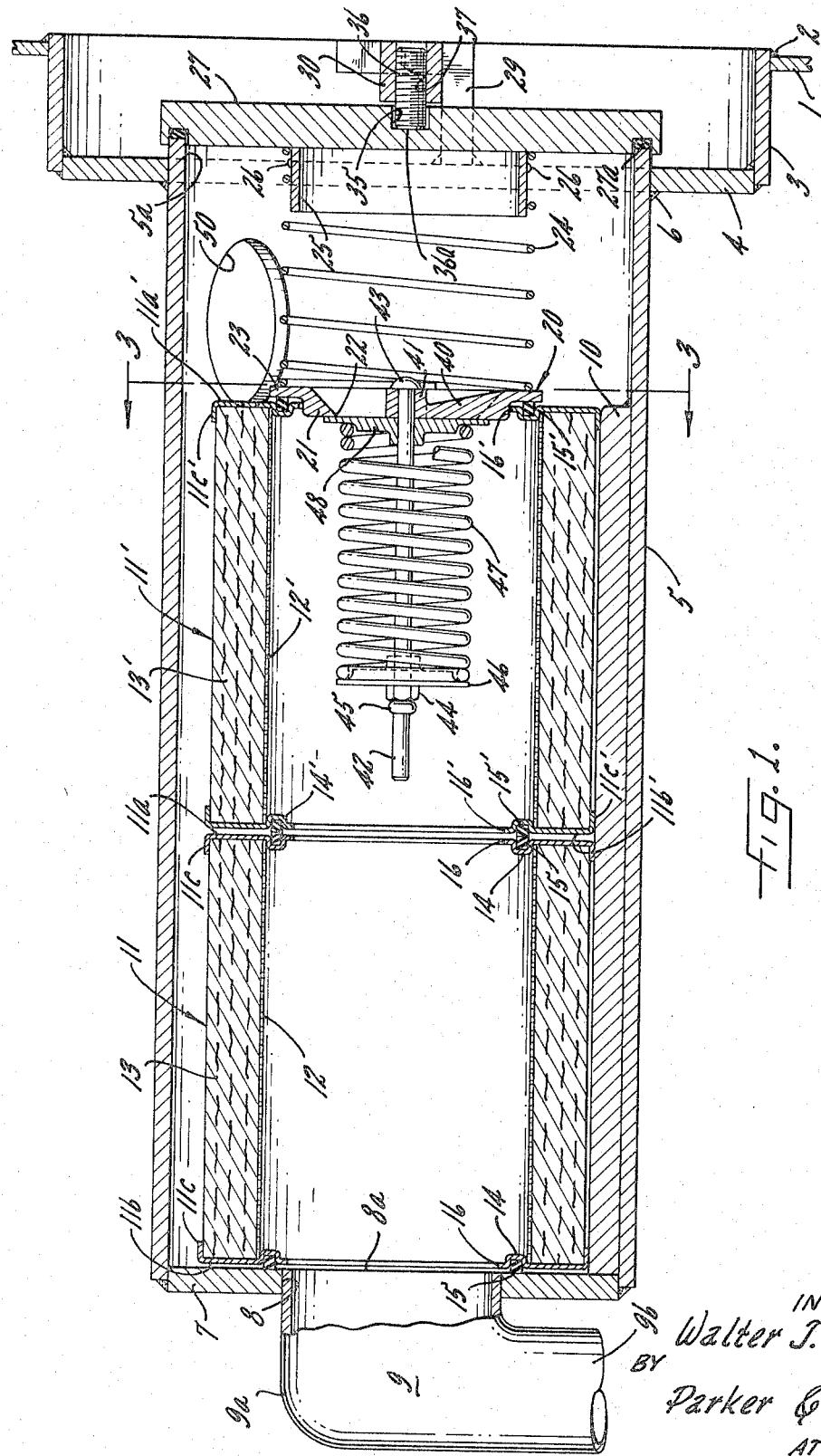
FIGURE 1 is a side view in partial cross section with parts turned for illustration.
Figure 2:
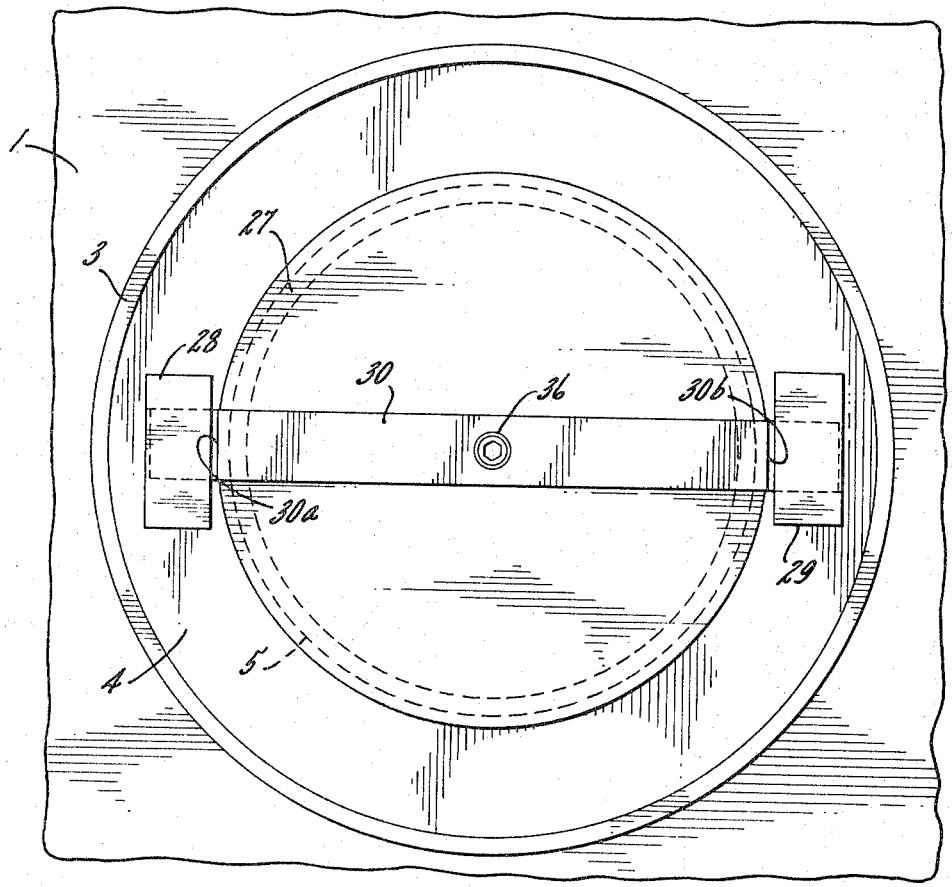
FIGURE 2 is an end view.

Indicated at 1 is a portion of the wall of a tank or reservoir. Secured to the wall 1, as by the weld 2, is a continuous flange 3 which may conveniently be circumferential. The flange 3 supports an annulus 4 therewithin, the members 3, 4 defining an offset chamber. The annulus 4 has a central aperture into which one end of the filter housing cylinder 5 is secured, as by the weld 6 for example. The opposite, open end of housing 5 carries an end plate 7 therewithin. A central aperture 8 is formed in the plate 7 communicating the central area within housing 1 with an outlet pipe 9. The outlet 9 has an elbow portion 9a and an end portion 9b extending therefrom to a point which may be conveniently located below the fill level of the reservoir 1.

Figure 3:
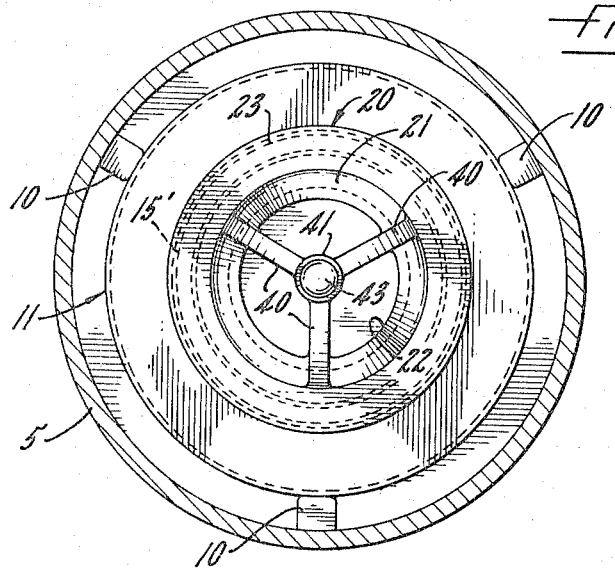
FIGURE 3 is a view taken on line 3—3 of FIGURE 1.

As may be best seen in FIGURE 3, a plurality of circumferentially spaced, longitudinally extending spacer and support ribs 10 are secured to the inner wall of housing 5. Slidable within the ribs 10 is a filter element 11 which is positioned at the end of housing 5 adjacent plate 7. The element 11 includes a pair of spaced annular end plates 11a, 11b. Each of the plates 11a, 11b includes an outer annular flange 11c. A relatively rigid perforated core 12 extends between the plates 11a, 11b and a filter medium 13 surrounds the core 12 and is held between plate 11a, 11b by the core 12 and flanges 11c. The plates 11a, 11b include inwardly offset portions 14, each of which receives a seal ring 15. The plates 11a, 11b are axially apertured as indicated at 16, the aperture 16 in plate 11b being axially aligned with and adjacent the opening 8a in plate 7 and the adjacent seal ring 15 engaging the inner surface of plate 7 about opening 8a.

It will be observed that a second filter element 11' is axially aligned with the element 11 and that a ring 15' of filter 11' is in contact with an opposed ring 15 of element 11. Since the element 11' corresponds with the element 11, the corresponding parts thereof are similarly numbered. While two such filter elements are shown, it will be realized that the number thereof may vary and that a single such filter element of appropriate length may be employed without departing from the nature and scope of the invention.

One aperture 16' of the element 11' is adjacent and axially aligned with an aperture 16 of filter element 11. The aperture 16 at the opposite end of filter element 11' has positioned therein a plate 20. The plate 20 has a central enlargement 21 defining a central aperture 22 therein. The enlargement 21 carries an outwardly extending annular flange portion 23. The flange 23 is seated against the ring 15' and held thereagainst by a yielding means, such as the spring 24.

The opposite end of spring 24 from that engaging flange 23 is retained by a sleeve 25 and weld spots 26 formed on the outer cylindrical surface thereof. The sleeve 25 extends inwardly from a closure plate 27 closing the open end 5a of cylindrical housing 5 opposite the end thereof containing plate 7. Closure plate 27 has an annular groove 27a adjacent the perimeter of its inner surface for sealing engagement with the outer edge of housing 5. It will be observed that the end portion defining the open end 5a of housing 5 extends into the recess area or chamber defined by the members 3, 4.

Secured at spaced, diametrically opposed positions on the surface of member 4 and within the continuous member 3 are a pair of generally L-shaped holder members or latch keepers 28, 29. It will be observed that the members 28, 29 extend from the member 4 to a point aligned with the outer edge of member 3. A lock or latch bar 30 has its opposite ends recessed as indicated at 30a, 30b to receive the upstanding leg portions of the L-shaped members 28, 29, respectively.

The outer surface of plate 27 has a central recess or well 35 formed therein. A setscrew 36 is threaded in a central bore 37 formed in the latch bar 30 for rotation therein toward and into well 35, as may be best seen in FIGURE 1.

The member 20 has circumferentially spaced radial ribs 40 supporting a central boss 41. A rod 42 has an end portion extending through boss 41 and a head 43 engaging the outer surface of boss 41. From the boss 41 the rod 42 extends axially into filter element 11'. A suitable fastener such as the nut 44 held on rod 42 by enlargement 45 thereof positions a spring-retainer plate 46. A spring 47 has one end coil engaging the plate 46 and an opposite end coil engaging a valve plate 48. The valve plate 48 is held in closing relationship with the central aperture 22 of member 20 and closes the spaces between rib 40 against the passage of fluid through plate 20. The valve plate 48 is slidable on the rod 42.

An inlet aperture 50 is formed in the housing 5 for communication with the internal area thereof and is conveniently located in lateral alignment with the space between member 20 and closure plate 27.

Whereas there has been shown and described an operative form of the invention, it should be understood that this showing and description are to be taken in an illustrative or diagrammatic sense only. There are many modifications in and to the invention which will be apparent to those skilled in the art and which fall within the scope and spirit of the invention.

The use and operation of the invention are as follows:
The invention provides a modular filter structure particularly adapted for employment with tanks or reservoirs and the like. A first module includes the filter housing and means for permanently mounting the same upon a tank or reservoir. In the forms shown, the housing is mounted within the reservoir and the entire closure structure for the housing is maintained substantially flush with an outer surface of the reservoir. The housing module includes a closure plate 27 for the open end 5a of cylindrical housing 5, the latch keepers 28, 29, the latch bar 30 and the setscrew 36 engaging the well 35 of plate 27 to urge the plate 27 into closure position and O-ring 27a into sealing engagement with the housing 5.

A filter module, as shown, includes two filter assemblies or elements 11, 11' arranged slidably within spacer ribs 10 and in axial alignment with each other and with housing 5. As above indicated, the filter module could comprise more than two such elements or a single such element if desired.

A third, or by-pass module includes a plate 20 carrying valve 48, rod 42 and spring 47, along with spring 24, for positioning plate 20 against a seal ring 15'.

The housing structure 3, 4, 5, with outlet conduit 9, is secured to the reservoir as a part thereof. A return conduit is connected to inlet 50. As the parts are shown herein, such return line (not shown) engages inlet 50 within a reservoir. Thereafter the filter assembly or module, comprising elements 11, 11', is moved through open end 5a of housing 5 and is slidably moved within the positioner ribs 10 the maximum distance within housing 5 to bring a seal ring 15 into contact with the inner surface of plate 7. Thereafter the by-pass module, including plate 20, valve 48, rod 42 and spring 47, is passed through the opening 5a of housing 5 and through the opening 16 presented by the filter assembly to seat flange 23 on the outermost seal ring 15', the major portion of the rod 42 and the spring 47 and valve 48 being thus positioned within the core 12'. With spring 24 having one set of its end coils engaging the outer surface of sleeve 25, the plate 27 is then seated upon the outer edge of housing 5 with the spring 24 and sleeve 25 penetrating the open end 5a of the housing 5 and the opposite end coil of spring 24 engaging flange 23 of member 20. With the plate 27 thus seated in closing position on housing 5, the latch bar 30 is dropped into place engaging the spaced keepers 28, 29. Thereafter the setscrew 36 is rotated to bring its end portion 36a into interpenetrating relationship with the central well 35 of plate 27 to tighten the plate 27 against housing 5 and O-ring 27a into sealing engagement therewith.

It will be observed that removal and installation, after cleaning or replacement, of the filter module, as well as the by-pass module, is rendered more easily accomplished with an absolute minimum of tools and expenditure of time and effort. The by-pass and filter modules may be simply installed and easily replaced and the structure may be assembled and disassembled without difficulty. While the setscrew 36, in reaction to the keepers 28, 29 and latch bar 30, serves to urge the plate 27 into closure engagement with housing 5, the engagement of portion 36a of setscrew 36 with the well 35 in plate 27 serves also to lock the latch bar 30 against accidental or inadvertent displacement or separation from keepers 28, 29.

The fluid to be filtered returns through a return line or conduit and is initially delivered through inlet 50 into the area within housing 5 outwardly of filter elements 11, 11'. Thereafter the fluid flows through the filter media 13, 13' and perforated cores 12, 12' from whence the thus filtered fluid flows outwardly through an outlet aperture 8 in plate 7 and through outlet conduit 9 for delivery to the area within the reservoir 1.

Should the filter media 13, 13' become unduly clogged, the pressure within housing 5 outwardly of the filter assembly 11, 11' will increase until the point is reached at which such pressure is effective to overcome the force of spring 47. Thereupon valve plate 48 will be moved by such pressure off the seat formed by enlargement 21 of plate 20 and the fluid will flow through the opening 22 between the ribs 40 and thereafter axially through the cores 12, 12' and outwardly through discharge outlet 8 and discharge conduit 9.

Thus is provided a modular filter structure of particular advantages in use with a reservoir, wherein a housing is permanently fixed within the reservoir, internal filter and by-pass modules are manually insertable and removable therefrom and a closure and latch structure of maximum simplicity and security is removably attachable with minimum effort.

What is claimed is:

1. In combination, a reservoir having a side wall, said side wall having a recessed wall portion, an aperture in said wall recessed portion, a tubular filter housing fixedly secured to and extending through said aperture and inwardly of said reservoir from said recessed wall portion, an inlet opening in said filter housing, a filter member slidably supported within said filter housing, an outlet opening positioned in said filter housing for delivery of fluid to the area within said reservoir, said filter housing having an open end extending into the recess formed in said side wall by said recessed wall portion, a closure plate for said housing open end, a by-pass member including a valve plate, a passage through said plate, a rod carried by said valve plate and extending inwardly of said filter element, a valve member slidable on said rod, a first yielding means having one of its ends engaging said valve member, a retainer plate carried by said rod and engaging the opposite end of said first yielding means, a second yielding means having one of its ends engaging the inner surface of said closure plate, the opposite end of said second yielding means engaging said valve plate and urging said valve plate against said filter element, said second yielding means urging said filter element inwardly of said housing, a keeper structure secured to said recessed wall portion within said recess and a latch bar structure engaging said keeper structure and said closure plate to urge the same against said housing open end.

2. The structure of claim 1 wherein said latch bar structure includes a rectilinear bar and a threaded member threadably engaging said latch bar, a socket formed in the outer surface of said closure plate, said threaded member having an end portion penetrating said socket.

3. The structure of claim 2 wherein said keeper structure includes a pair of L-shaped members secured to said recessed wall portion on opposite sides of said closure plate within said recess formed by said recessed wall portion and wherein said threaded member engages said latch bar and said socket substantially centrally of said latch bar and said closure plate.

References Cited by the Examiner

UNITED STATES PATENTS

| 1,281,147 | 10/1918 | Dehn | 210—451 |
|-----------|---------|------|---------|
| 2,348,925 | 5/1944 | Reichhelm | 210—236 |
| 2,732,075 | 1/1956 | Bender | 210—249 X |
| 2,811,218 | 10/1957 | Winslow | 210—453 X |
| 2,868,382 | 1/1959 | Best | 210—130 X |
| 2,870,914 | 1/1959 | Bloch | 210—453 |
| 3,064,819 | 11/1962 | Jones | 210—266 |

FOREIGN PATENTS

| 141,958 | 4/1949 | Australia. |
| 452,922 | 11/1948 | Canada. |

REUBEN FRIEDMAN, *Primary Examiner.*

F. SPEAR, *Assistant Examiner.*